(12) United States Patent
Westberg et al.

(10) Patent No.: US 9,386,597 B2
(45) Date of Patent: Jul. 5, 2016

(54) QOE-AWARE TRAFFIC DELIVERY IN CELLULAR NETWORKS

(75) Inventors: Lars Westberg, Enköping (SE); Attila Mihály, Dunakeszi (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 168 days.

(21) Appl. No.: 14/111,656

(22) PCT Filed: Oct. 17, 2011

(86) PCT No.: PCT/EP2011/068130
§ 371 (c)(1),
(2), (4) Date: Dec. 4, 2013

(87) PCT Pub. No.: WO2012/139664
PCT Pub. Date: Oct. 18, 2012

(65) Prior Publication Data
US 2014/0126502 A1    May 8, 2014

Related U.S. Application Data

(60) Provisional application No. 61/475,560, filed on Apr. 14, 2011.

(51) Int. Cl.
*H04W 72/12* (2009.01)
*H04W 76/02* (2009.01)
*H04W 80/04* (2009.01)

(52) U.S. Cl.
CPC ...... *H04W 72/1231* (2013.01); *H04W 72/1247* (2013.01); *H04W 76/02* (2013.01); *H04W 80/04* (2013.01)

(58) Field of Classification Search
None
See application file for complete search history.

(56) References Cited

U.S. PATENT DOCUMENTS

| 8,259,687 B2* | 9/2012 | Foore | H04J 3/1682 370/329 |
| 2002/0133821 A1* | 9/2002 | Shteyn | H04N 5/44543 725/46 |

(Continued)

FOREIGN PATENT DOCUMENTS

WO    WO 2010/088490 A1    8/2010

OTHER PUBLICATIONS

3GPP TS 23.401 V9.1.0 (Jun. 2009), 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9), 234 pages.

(Continued)

*Primary Examiner* — Brandon Renner
*Assistant Examiner* — Deepa Belur
(74) *Attorney, Agent, or Firm* — Myers Bigel & Sibley, P.A.

(57) ABSTRACT

A method of delivering packets from a radio access network to a user terminal. The method comprises establishing a radio access bearer for transporting data to the user terminal from a radio layer control entity responsible for constructing downlink radio frames. Within the radio access network, an IP traffic flow destined for said user terminal is observed and a delivery priority determined for the IP traffic flow taking into account a user application to which the traffic relates. The delivery priority is dynamically adjusted in dependence upon the desired arrival time or delivery rate of packets within the IP traffic flow at the user terminal. With respect to other downlink user traffic to be sent over the radio interface, packets of the IP traffic flow are scheduled for transmission to the user terminal over the established radio access bearer, and or the scheduling weight of radio frames of the established radio access bearer adjusted, in accordance with the current delivery priority. The method further comprises, upstream of said radio layer control entity, carrying out a pre-scheduling of packets of said IP traffic flow with respect to other IP traffic flows.

17 Claims, 11 Drawing Sheets

(56) References Cited

U.S. PATENT DOCUMENTS

| | | | |
|---|---|---|---|
| 2003/0069964 A1* | 4/2003 | Shteyn et al. | 709/225 |
| 2009/0122717 A1* | 5/2009 | Das | H04L 47/803 370/253 |
| 2010/0248643 A1* | 9/2010 | Aaron et al. | 455/68 |
| 2011/0167170 A1* | 7/2011 | Kovvali et al. | 709/232 |
| 2011/0252155 A1* | 10/2011 | Parekh | H04N 21/23406 709/231 |
| 2012/0005367 A1* | 1/2012 | Bettink | H04L 47/41 709/233 |
| 2012/0120800 A1* | 5/2012 | Lientz et al. | 370/235 |
| 2012/0221706 A1* | 8/2012 | Westberg | 709/223 |
| 2013/0304616 A1* | 11/2013 | Raleigh | G06Q 20/145 705/34 |
| 2014/0344471 A1* | 11/2014 | Valk et al. | 709/231 |
| 2015/0312933 A1* | 10/2015 | Eriksson | H04W 72/1263 370/329 |

OTHER PUBLICATIONS

S. Nádas et al.: "Providing congestion control in the Iub Transport Network for HSDPA", Communications Society, IEEE GLOBECOM 2007; pp. 5293-5297.

S. Nádas et al.: "HSUPA Transport Network Congestion Control", 978-1-4244-3062-8; 2008 IEEE; 6 pages.

International Search Report and Written Opinion of the International Searching Authority, PCT Application No. PCT/EP2011/068130, Feb. 20, 2012.

International Preliminary Report on Patentability, PCT Application No. PCT/EP2011/068130, Jul. 22, 2013.

Motorola, "QoS Differentiation within SAE Bearers", 3GPP Draft; S2-062900_QOS_IN_SAE_BEARER, SA WG2, Sophia Antipolis, France, Aug. 23-25, 2006, 5 pages.

Yang et al., "A Signal-to-Interference Ratio Based Downlink Scheduling Scheme for WCDMA Mobile Communication System", *IEEE 19th International Conference on Advanced Information Networking and Applications*, Piscataway, NJ, Mar. 25-30, 2005, pp. 570-575.

\* cited by examiner

| Flow_ID | Media rate (R) | Buffer fill size (B) | Timestamp (T) |
|---|---|---|---|
| X | $R_x$ | $B_x$ | $T_x$ |
| ... | ... | ... | ... |

QOE-AWARE TRAFFIC DELIVERY IN CELLULAR NETWORKS

CROSS REFERENCE TO RELATED APPLICATIONS

This application is a 35 U.S.C. §371 national stage application of PCT International Application No. PCT/EP2011/068130, filed on 17 Oct. 2011, which itself claims priority to U.S. Provisional Patent Application No. 61/475,560, filed 14 Apr. 2011, the disclosure and content of both of which are incorporated by reference herein in its entirety. The above-referenced PCT International Application was published in the English language as International Publication No. WO 2012/139664 A1 on 18 Oct. 2012.

TECHNICAL FIELD

The present disclosure relates to achieving Quality of Experience (QoE) aware traffic delivery in cellular networks. A traffic example to which this is applicable is so-called Progressive Download Internet video although the invention has wider applicability.

BACKGROUND

Over-the-top (OTT) delivery can be defined as the delivery of content, e.g. voice and or video, over an access network without the access network provider being involved in the control or distribution of the content itself. Today OTT services are delivered as normal best effort (BE) traffic. However, in some cases the OTT applications require specific treatment in order to obtain a satisfactory experience at the receiver side, often referred as Quality of Experience (QoE). This is particularly true in the case of cellular access networks.

One important application example is that of instantaneous video delivery. Typical video applications are designed for the Internet and a way to address the problems resulting from network congestion is to temporarily stop the rendering of new video-data on a user terminal's display, and instead present a "frozen-image". A spinning symbol may appear on the display to inform the user that the player is waiting for new data and until the size of the buffered video reaches some pre-configured threshold. The player may attempt to adapt to the congestion situation by increasing the pre-configured threshold.

New deployments of video streaming applications, e.g., chunk-based HTTP-streaming, assume that the client or server adjusts the data volume based on the measured TCP-throughput. The lower the data volume, the lower the experienced video quality. However, frozen images can be eliminated if the TCP-throughput is above a certain lower bound. It is noted that such applications may deliver a significantly reduced QoE (as compared with non-chunk based mechanisms) when the resources are below some minimal bandwidth threshold. When a chunk has been downloaded, a video may start to play but then playout stops before the next chunk is present in the buffer. This means that the occurrence of frozen image will be frequent compared with a progressive download of the content.

SUMMARY

According to a first aspect of the present invention there is provided a method of delivering packets from a radio access network to a user terminal. The method comprises establishing a radio access bearer for transporting data to the user terminal from a radio layer control entity responsible for constructing downlink radio frames. Within the radio access network, an IP traffic flow destined for said user terminal is observed and a delivery priority determined for the IP traffic flow taking into account a user application to which the traffic relates. The delivery priority is dynamically adjusted in dependence upon the desired arrival time or delivery rate of packets within the IP traffic flow at the user terminal. With respect to other downlink user traffic to be sent over the radio interface, packets of the IP traffic flow are scheduled for transmission to the user terminal over the established radio access bearer, and or the scheduling weight of radio frames of the established radio access bearer adjusted, in accordance with the current delivery priority. The method further comprises, upstream of said radio layer control entity, carrying out a pre-scheduling of packets of said IP traffic flow with respect to other IP traffic flows.

At least certain embodiments of the present invention are able to achieve an improved flow of packets to a user terminal. In the case of Progressive Download (PD) traffic, this improved flow can result in enhanced user experience.

A particular approach to implementing the method involves providing feedback from the radio control layer entity to said pre-scheduler in order to ensure that a minimum queue size is maintained at the pre-scheduler. This allows the pre-scheduler to control downlink packet delivery, shifting, at least to some extent, queue management from the radio control layer entity to the pre-scheduler.

According to a second aspect of the present invention there is provided apparatus configured to deliver packets, received within a radio access network and destined for a user terminal, to a radio control layer entity. The apparatus comprises a packet monitor for observing an IP traffic flow destined for said user terminal and for determining a delivery priority for the IP traffic flow taking into account a user application to which the traffic relates. The apparatus further comprises a delivery priority controller for dynamically adjusting the delivery priority in dependence upon current radio conditions and the desired arrival time or delivery rate of packets within the IP traffic flow at the user terminal, and a scheduling controller for scheduling packets of the IP traffic flow for transmission to the user terminal over the established radio access bearer, with respect to other downlink user traffic to be sent over the radio interface, and or for adjusting the scheduling weight of radio frames of the established radio access bearer, in accordance with the current delivery priority. There is further provided a pre-scheduler for carrying out a pre-scheduling of packets of said IP traffic flow with respect to other IP traffic flows.

DETAILED DESCRIPTION

Figure 1:
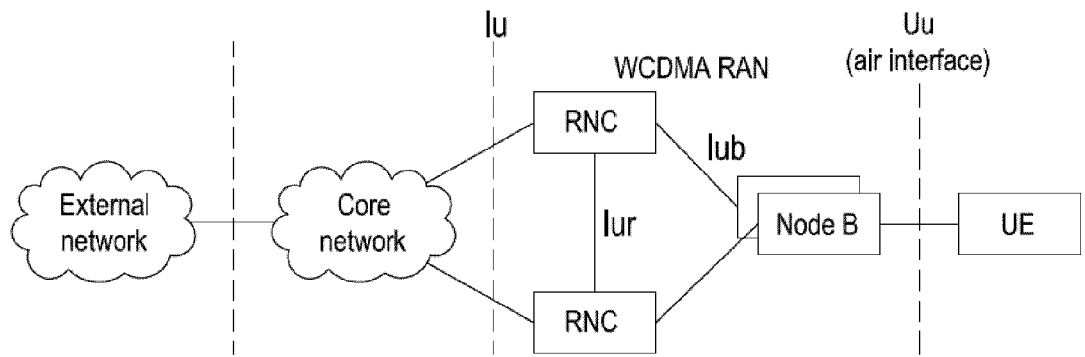
FIG. 1 illustrates schematically a WCDMA (3G) network architecture.

The following abbreviations are used in this description:
3GPP 3dr Generation Partnership Project
BE Best Effort
CQI Channel Quality Index
DPI Deep Packet Inspection
DTT Delay Tolerant Traffic
ECN Explicit Congestion Notification
GBR Guaranteed Bit-Rate
HSPA High-Speed Packet Access
HTTP HyperText Transfer Protocol
LTE Long Term Evolution
OT Offset Time
OTT Over The TOP
PD Progressive Download
PCPS Per-Cell Pre-Scheduling function
QoE Quality of Experience
QoS Quality of Service
RAN Radio Access Network
RBS Radio Base Station
RNC Radio Network Controller
TCP Transmission Control Protocol
UE User Equipment The main problem that the present proposal addresses is that of how to guarantee a Quality-of-Experience (QoE) for multiple different Over-the-Top (OTT) applications in cellular, mobile networks in a spectrum-efficient way. In the case of instantaneous video delivery, the QoE target would be to minimize the number and rate of frozen images in any given download session.

In the absence of appropriate solutions, it can be expected that the delivery of Internet videos via mobile access will be qualitatively different from that available via a fixed access, resulting in a larger number of video freeze/rebuffering events, especially if the content is served over Interactive radio bearers together with other BE traffic. The reason for this is that the bottleneck in the case of mobile access is on the 'first mile' (i.e., on the radio interface), and this is vulnerable to both statistically large traffic fluctuations and to channel quality (in turn dependent upon factors such as the subscriber's position, velocity, activity, etc).

One approach to addressing these issues is to apply the standard Quality-of-Service (QoS) architecture for 3GPP (See, e.g., 3GPP TS 23.401 V9.1.0 (2009-06)) to attempt to guarantee the required long-term throughout for all Progressive Download (PD) applications by utilising Guaranteed Bit Rate (GBR) bearers towards the user terminal. This however presents scalability problems in terms of bearer setup signalling and the limited availability of GBR bearers allowed by the mobile network. Some other lightweight mechanism is desirable in order to provide better radio spectrum efficiency.

WO2010088490 proposes an approach to efficiently enabling PD applications which makes use of traffic "throttling". The media content is segmented into smaller parts (e.g., corresponding to 2-minute video segments) and each segment is scheduled for delivery from the radio access network to the user terminal based on the estimated presentation time (i.e., the time when the given segment is needed by the client). The goal of this approach is that the delivery time for the segment should be less (but not much less) than the presentation time. The load balancing mechanisms employed by the access network over the radio interface ensure that, by delaying some of the segments of a bearer subject to relatively good radio conditions, content sent over other bearers has an increased chance of being delivered in time. The approach described in WO2010088490 achieves traffic throttling by means of an HTTP-proxy or a TCP-proxy, that maintains separate TCP sessions towards the client and the content source, and a transit buffer or cache that temporarily stores the content. The proposed mechanism may also extend to traffic throttling of other types of applications that do not require strict completion deadlines such as is the case with PD video.

The approach of WO2010088490 has a number of potential weaknesses including:

1) The approach assumes full knowledge of all of the different applications by the scheduler. This is difficult and even practically impossible to achieve given the large number of P2P applications that are often encrypted by the client.
2) Throttling of some high-bandwidth sessions for certain users may indeed provide additional capacity for some other users. However, there is no safe solution for the case when it is detected that data for some application cannot be delivered to a user in time. That is, the approach does not make it possible to give additional resources to this application. It may be difficult to predict the potential gain achievable using the approach and to dimension the network accordingly.
3) Throttling of traffic is generally not spectrum-efficient since it may leave some radio capacity unused even if there is traffic to send. In the case of PD applications for example, such periods could be used to pre-fill the player buffers in anticipation of later congestion.

To more efficiently address the problems presented by PD applications, various approaches will now be described which take into account both the current radio conditions and available traffic information concerning ongoing flows, with the aim of improving end user QoE in a spectrum efficient way.

Figure 2:
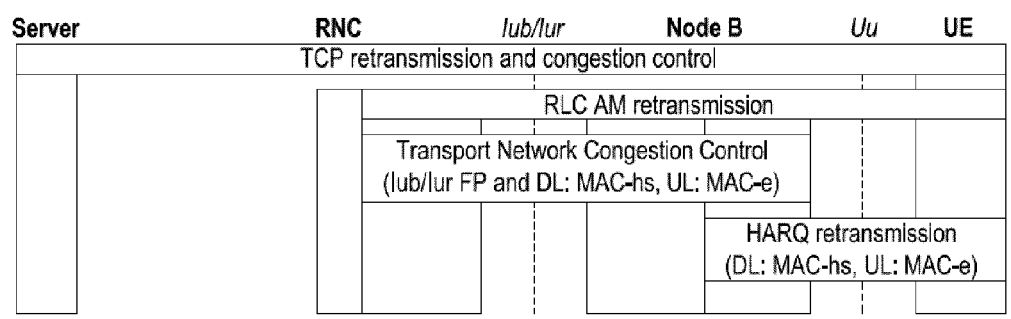
FIG. 2 illustrates protocol layers within the network architecture of FIG. 1.

A cellular radio access network typically comprises a base-station and a common radio controller. In a 3G architecture, the common radio controller (or radio layer control entity) is usually the RNC. Between the base-station and RNC a flow-control mechanism is implemented to ensure that the queues in the RNC, transport network and base-station do not become congested. The flow-control algorithm detects packet losses and delay. FIG. 1 illustrates the 3G architecture, whilst FIG. 2 illustrates the 3G protocol layers. In the LTE architecture, a similar setup is envisioned with at least two nodes, namely a base-station and a common entity similarly containing a cache. This entity could be a new entity or the current Serving-GW and/or PDN-GW. For the purpose of illustration, the following discussion relates to the 3G architecture. It will however be appreciated that this is merely by way of example.

According to a first embodiment, a Media Cache within the Radio Access Network (RAN) and upstream of the radio layer control entity (e.g. RNC) is configured to be aware of the needs of at least the most relevant applications and to manipulate the radio scheduling so that some and possibly all applications receive the required QoE. [In the following discussion, the radio scheduling function within the radio layer control entity is referred to as the "RLC/MAC-scheduler".] In the case of, for example, video applications and delay-tolerant applications, this is achieved by the media cache communicating with a local content cache. A pre-scheduler prioritises between the different traffic types for a given user terminal (or User Equipment, UE, according to 3G terminology).

Figure 3:
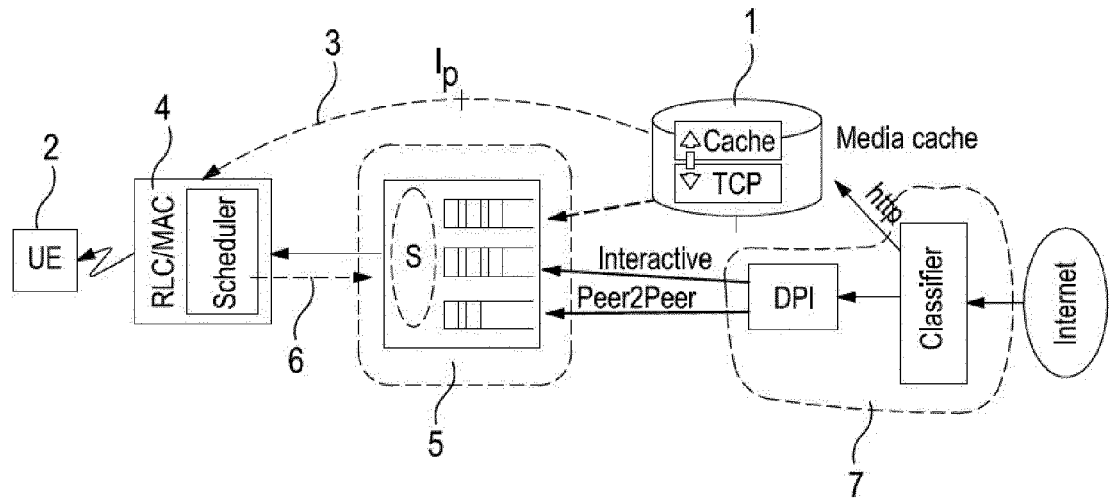
FIG. 3 illustrates a conceptual view of a prioritised scheduling scenario in a radio access network, according to a first embodiment.

FIG. 3 illustrates schematically an example system configured to provide the following functions:

1) The central component is a Media Cache 1, e.g., an HTTP-proxy that has full knowledge about the different ongoing media applications and their bandwidth demands for download to the UE 2;
2) The Media Cache has a control interface IR 3 to the RLC/MAC-scheduler 4 through which the Media Cache can control the scheduling of the different bearers in order to fulfil the throughput requirements of the different flows;
3) A pre-scheduler 5 which prioritises between the different traffic types associated with the same UE. Effectively, there is one pre-scheduler 5 per UE; and/or
4) An interface IF 6 from the RLC/MAC-scheduler 4 to the pre-scheduler 5 that is used to provide feedback to the pre-scheduler about the radio conditions. The pre-scheduler 5 may only be needed when the UE has simultaneous flows to the same UE.
5) A IP-classifier/DPI 7 that classifies traffic from the Internet. Some of the traffic goes to the Media Cache and some of the traffic goes directly to the pre-scheduler.

The Media Cache 1 is configured to have knowledge of the current transfer conditions in the RAN, as well as knowledge about the different ongoing media applications and their throughput requirements. For example, in the case of a PD of a given media, the download of a minimum data volume/time is required. Whilst the bit-rate can vary during the session, the download must support a minimum volume sufficient to fill the buffer in the UE.

Figure 4:
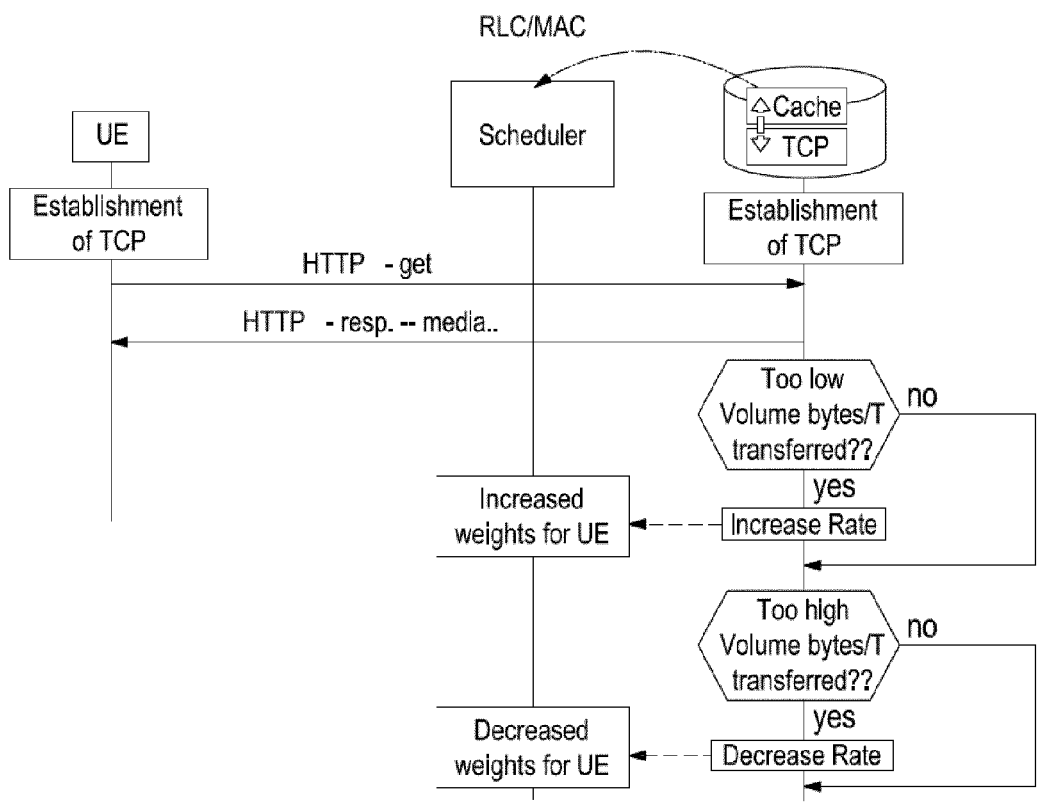
FIG. 4 is a state diagram further illustrating the prioritised scheduling scenario of FIG. 3.
Figure 5:
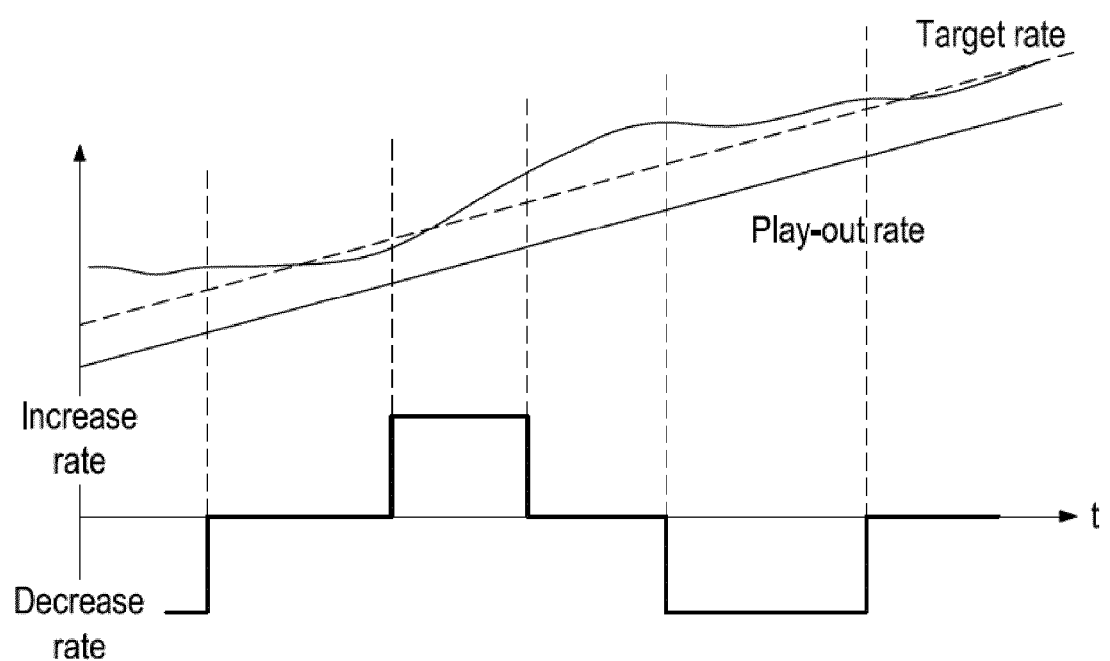
FIG. 5 illustrates the result in terms of throughput achieved using the scenario of FIGS. 3 and 4 and employing three state-transitions to control the scheduling weights within the RLC/MAC scheduler.

The Media Cache can dynamically adjust the scheduling weights for a specific radio bearer in the RLC/MAC-scheduler such that both uplink and downlink performance can be increased. FIG. 4 illustrates the corresponding state diagram. FIG. 5 is an example of a three-states transition implementation, namely: "decrease rate", "do nothing", and "increase rate".

The change of weights needs to be sent from the cache to the RLC/MAC-scheduler. A simple solution is to use a packet marking scheme, i.e. by assigning a bit in the Tunnel-headers GTP/UDP/IP/Ethernet—headers or to use ECN/DSCP in the end-2-end tunnel header. A DSCP-value can then be mapped to a set of pre-configured weights. Other marking solution (i.e. in GTP-tunnel headers) can be used to transfer the information to the RBS that allows more weights.

When the RLC/MAC is operating in the acknowledge mode, the RLC/MAC scheduler 4 attempts to guarantee the ordered delivery of the packets, so when packets have entered the scheduler 4 there is no point in implementing multiple queues. The packets will in any case be delivered in the order of arrival into the scheduler 4. The pre-scheduler 5 is therefore configured to prioritise between the different traffic types of the same UE 2 when there are simultaneous sessions to that UE 2 within a single RAB (i.e. the default bearer). Without such pre-scheduling it could be the case that, even if the radio capacity is increased for a UE with media traffic by adjusting the scheduling weights for the RAB, other (non-http) traffic types "grab" the extra available throughput. The pre-scheduler 5 is configured to perform logical queuing that operates towards a single RAB. This means that the RAB can have different queues before entering the RLC/MAC-scheduler 4.

An issue to be addressed when implementing the pre-scheduler is that of ensuring that there are packets queued in the pre-scheduler. Without such a queue, it will not be possible to implement any pre-scheduling (nb. implementing a queue at the pre-scheduler does not further delay the flow of end-to-end traffic as it merely shifts a queue from one RAN entity to another). Some form of feedback from the RLC/MAC-scheduler is required in order to limit the queue in RLC/MAC-scheduler and to ensure that a queue exists in the pre-scheduler (i.e. to shift a part of the queue from the RLC/MAC-scheduler to the pre-scheduler). The pre-scheduler queue can utilise any appropriate queuing algorithm, e.g. strict priority queuing, WFQ, Weighted round Robin WRR. Configuration of the pre-scheduler can be done by OAM, or by the Cache-application. A few examples of possible feedback mechanisms will now described.

Figure 6:
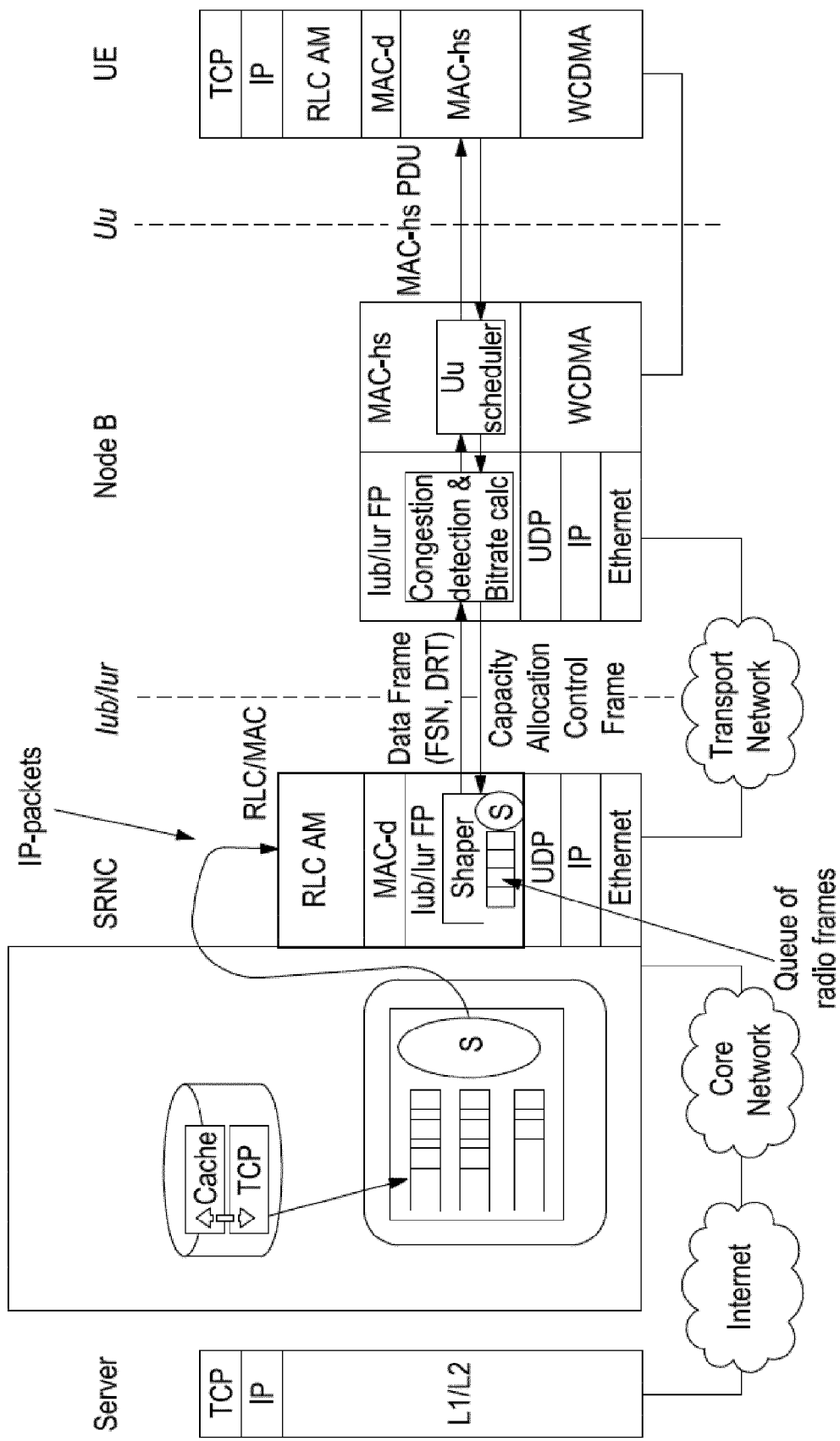
FIG. 6 illustrates a feedback mechanism for controlling the queue size in a pre-scheduler in the architecture.

A feedback mechanism available for HSPA networks is the HSDPA flow control (see FIG. 6). This is based on the sending of control messages by the RBS to the RNC in so-called CA control frames, with bit-rate indication to the RLC layer for the congested bearers. [The original scope of flow control was to avoid overflow of MAC buffers, and later it was extended to also handle congestion in RAN backhaul.] The CA control frames are sent regularly in the case of congestion. This sending frequency may be set by default, for example to once every 400 ms, but can be easily increased to once every 100 ms, which is deemed sufficient for a dynamic change of the output rate in the pre-scheduler. In order that the pre-scheduler can use this information, the CA frames should be duplicated or the rate information should be communicated from the RNC to the pre-scheduler.

The queue-size mapping function is responsible for re-mapping the queue-size to the HSDPA-flow-control implementations. The HSDPA-flow control can be used as a flow-interaction example after one has mapped the queue-interactions between the two queues. The intention is to have a bit-rate adaptation between the two queue, see for example:

"http://www.ericsson.com/res/thecompany/docs/journal_conference_papers/wireless_access/GLOBECOM07_szilveszter.pdf", and
"http://www.ericsson.com/res/thecompany/docs/journal_conference_papers/wireless_access/Globecom08_nadas.pdf"

The HSDPA flow-control uses: Sequence Number (FSN) and Delay Reference Time (DRT). The mapping function could be:

sequence_number_RLC/MAC=k*(sequence_number).

This means that a number of segments stored in an RLC/MAC buffer are mapped proportionally to another buffer type where IP-packets are stored. For example:

a number X of RLC-segments is mapped to k*X IP-packets.

The Delay Reference Time (DRT) cannot be mapped in the same way. One reason for this is that the no information can be inserted within the RLC/MAC packets. A mapping function must therefore "catch" the DRT and compare it to the RLC/MAC-queue. As is the case for the queue-size estimate, the DRT=k*(RLC_MAC_queue size).

Another solution may be to have a simple, "binary", stop and go feedback when the queue in the RLC/MAC is above a certain size. This means that no specific re-calculation is needed. The feedback can be encapsulated in IP-packets and sent between the two queues even if a transport network is located between the two queues.

In the case of LTE networks, the ECN congestion notification may be used. In the standard definition in IETF RFC 3168, ECN is an end-to-end method to signal congestion (i.e., between the end-hosts); for this, a 2-bits range in the IP header is used, allowing for 4 states, out of which '11' (ECN congestion experienced, ECN-CE) indicates congestion. However, recently another application of ECN, called ConEx (Congestion Exposure, draft-ietf-conex-concepts-uses-01), has been discussed. ConEx allows the receiver to report back congestion information in the form of 'congestion volume', e.g., measured in kbit/s, based upon which the sender (who reinserts the information in the downlink packets) and the nodes in the path may infer how much congestion a given flow causes downstream. It may be possible to use a partially deployed ConEx, based on which the RBS may report congestion information back to the pre-scheduler in the form of regular reports.

An alternative approach to efficiently providing a high QoE to users, and which takes into account both the current radio conditions and the traffic information about the ongoing flows within a cell area, will now be described. This alternative approach relies upon a per-cell pre-scheduling function (PCPS) that is aware of the needs of at least the most relevant applications (e.g., video applications and delay-tolerant applications) and manipulates the sending order of the packets belonging to the different flows to the RLC/MAC-scheduler based on radio feedback.

Figure 7:
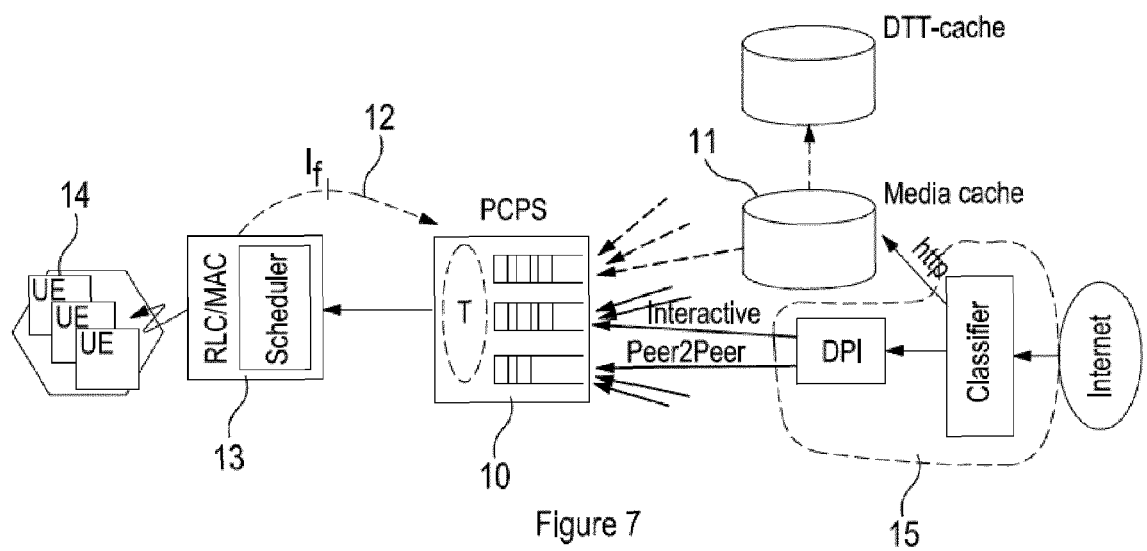
FIG. 7 illustrates a conceptual view of a prioritised scheduling scenario in a radio access network, according to a second embodiment.

FIG. 7 is a high level schematic illustration of this alternative approach, where the PCPS 10 is a logical component having the following functions:

The PCPS 10 maintains up-to-date information regarding the ongoing flows based on which the pre-scheduling algorithm in the PCPS may prioritise the packets in an optimal way. Effectively, there is one pre-scheduler per cell (in contrast to the embodiment of FIG. 3 which provides one pre-scheduler per UE).

An optional interface may exist between the PCPS 10 and the Media Cache 11 (caching media or some delay-tolerant traffic (DTT)) to alert the PCPS about a new flow request from the Cache, and to cause the PCPS to fetch relevant flow information. [An alternative to this interface is to provide a "built-in" classifier/DPI function in the PCPS that recognizes the flow requests and the relevant parameters, including the media rate and other information needed to perform the pre-scheduling.]

An interface $I_F$ 12 between the PCPS 10 and the RLC/MAC-scheduler 13 is used to provide feedback to the PCPS about the available radio resources from the radio network and that will be used by the PCPS to calculate the amount of data that should be delivered from the PCPS in the next period.

The data pre-scheduling component itself, which is a time-based per-cell aggregate scheduling based on the information received from the components above. Time-based scheduling means that the relative packet prioritisation depends on when the packet should arrive at the client to avoid QoE degradation.

Also illustrated in FIG. 7 are the UE 14 and DPI/Classifier 15.

Figures 8, 9:
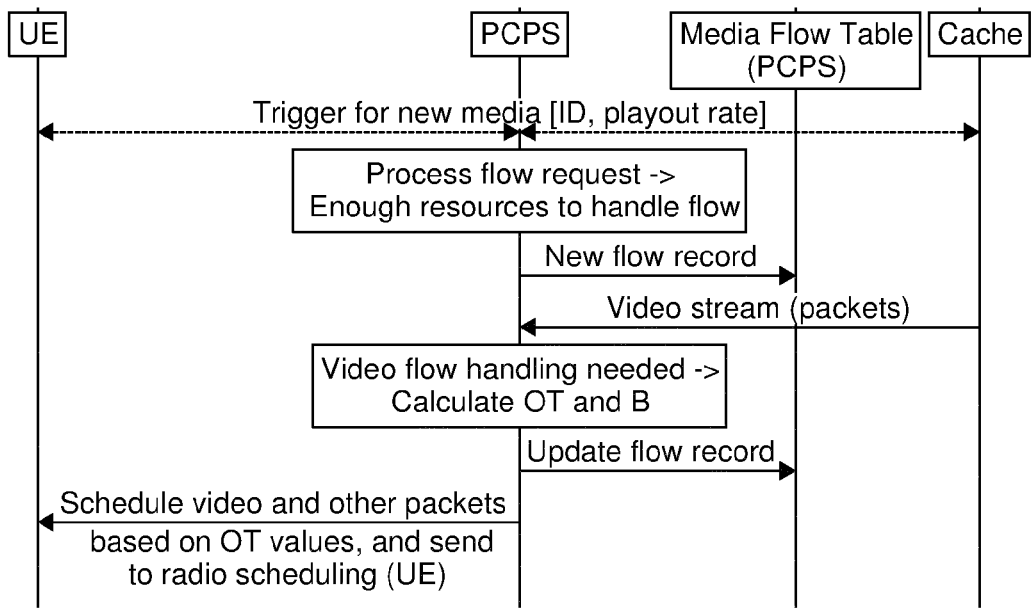
FIG. 8 is a state diagram further illustrating the prioritised scheduling scenario of FIG. 7.
FIG. 9 illustrates schematically a media flow table structure maintained by a PCPS of the architecture of FIG. 7.

FIG. 8 illustrates the overall process of video delivery when employing the architecture of FIG. 7. The process assumes that the PCPS logic decides that special PD flow handling is required in order to guarantee an appropriate QoE and also that there are enough resources to handle the given media flow.

As described above, the PCPS should maintain up-to-date information regarding the ongoing flows based on which the pre-scheduling algorithm in the PCPS may prioritise the packets in an optimal way. One possibility is that, for each ongoing flow to be prioritised, the PCPS maintains an entry in a media flow a table consisting of the flow identifier and other information regarding the ongoing flows. For example, in the case of a PD video application, this may be (a) the play-out rate, (b) the buffer fill state in the client and (c) a timestamp, as illustrated in FIG. 9, where (a) and (b) are conveyed by the cache or directly inferred from the UE request during the starting of the application.

Figure 10:
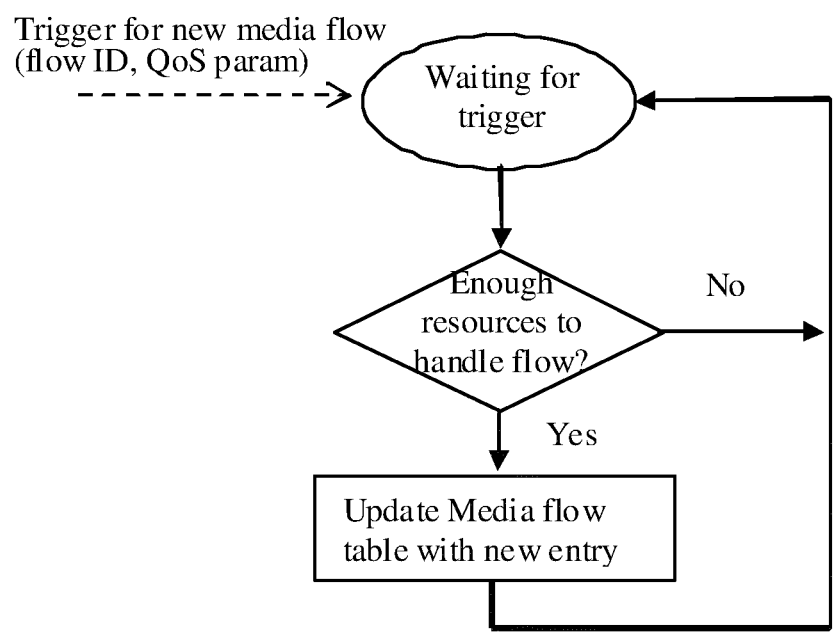
FIG. 10 is a flowchart illustrating a process for handling new media flow requests at the PCPS.

FIG. 10 is a flowchart illustrating the processing of new flows in the PCPS. It is assumed that whenever a new PD flow is requested in the controlled cell, the PCPS is informed about this. If the media flows are served from a local cache in the RAN node controlling the radio scheduling (i.e., eNodeB in case of LTE or RNC in case of 3G/HSPA) then the cache has all the required knowledge about the ongoing media downloads (media rate, flow identifiers) that are needed for the pre-scheduler in the PCPS. The trigger for a new media flow may therefore come from the Cache if there is an interface towards the cache. Alternatively, a built-in classifier/DPI function in the PCPS can recognize the flow requests and the relevant parameters, including the media rate.

The PCPS checks whether there are enough resources to handle the flow with the required QoE. The decision is based on the load status of the pre-scheduler and the information about the available radio capacity received in the previous period. For example, if the pre-scheduler queues are not filled or the smallest Offset Time (OT) value of the currently prioritized flows is much larger than the current time instance, this is an indication that sufficient resources are available.

If the decision is positive, i.e. sufficient resources are available, then the PCPS updates the media flow table by adding a new entry corresponding to the new flow. If the decision is negative, then no new entry is created for the given flow in the media flow table and consequently the given flow will not be given a QoE-aware treatment. In this case, the PCPS may also send notification to the management system to inform it about potential service degradation due to shortage of resources.

Figure 11:
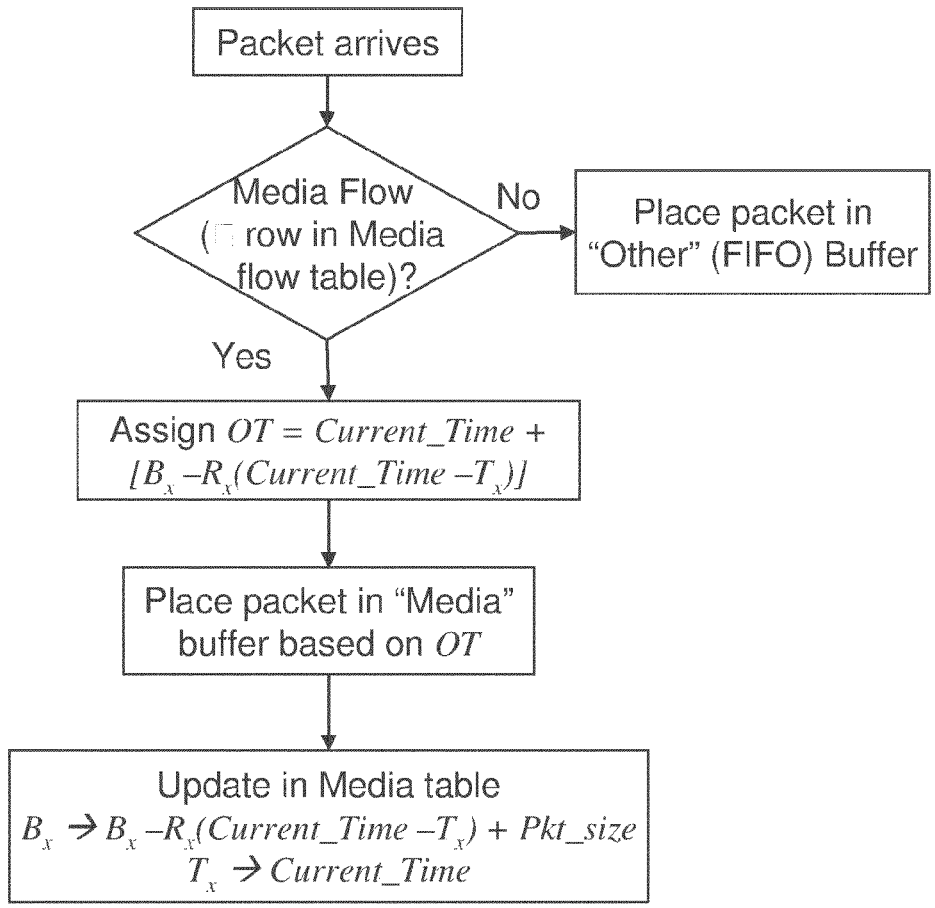
FIG. 11 illustrates a procedure for calculating an offset time and buffer fill level.

An example PCPS algorithm for calculating offset time and buffer fill is shown in FIG. 11. This algorithm is based on the evaluation of the offset time (OT) for each media packet, which is the time until the given packet has to reach the client in order to avoid buffer under-run and consequently frozen play-out. The following terminology is used in FIG. 11:

OT=offset Time, i.e., time difference between the current time and the time when the given chunk of content will be 'consumed' by the application;

R X: playout rate for video flow X (from the media flow table);

B X: the buffer fill state for video flow X (from the media flow table);

T X: the timestamp of last buffer fill state calculation for video flow X (from the media flow table).

It is noted that, if there are sufficient radio resources, the ongoing PD flows can accumulate large enough buffers so there is no need for special QoS/QoE handling mechanisms. Since the specific scheduling on the data plane may be resource sensitive, it is advisable that the PCPS has an internal function that evaluates whether the process of offset time and buffer fill calculation, as well as special packet scheduling based on these factors, is needed or not. In the simplest solution, the decision to apply special treatment may be based on the number or cumulated rate of the flows in the media flow table.

Assuming that specific PD flow handling by PCPS is needed, the process is as follows. The client buffer fill state and timestamp is continuously updated upon the arrivals of new packets belonging to each media flow in the Media flow table. This may be based, for example, on the procedure illustrated in FIG. 11. The PCPS maintains two buffers for the packets to be served to each cell:

A first buffer in which the packets of the ongoing media flows are ordered according to the offset time, and A second buffer for all "other" non-media packets for which no QoE guarantees apply.

A refinement of the described offset-time calculation procedure is possible, taking into account the desirability that at the beginning of the download the video frames should be sent faster in order to decrease the play-out delay, i.e., the delay elapsed between pressing the download button and starting the effective play-out. This may be done on a timer-basis: when a new media flow is started, the OT is calculated based on an increased media rate (the exact value used may depend on the current radio conditions).

Figure 12:
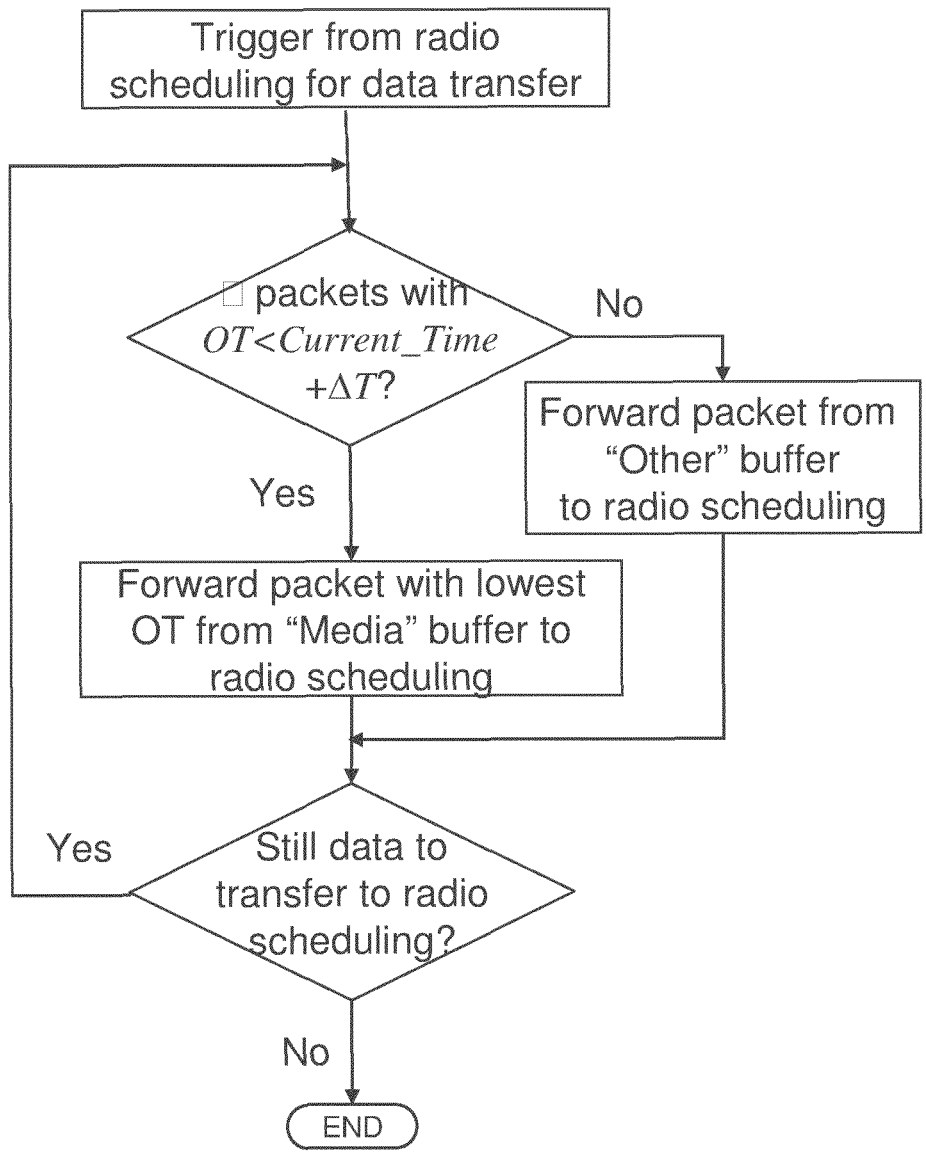
FIG. 12 illustrates a procedure for handling data scheduling and forwarding in the PCPS.

The PCPS employs the procedure of FIG. 12 to send packets to the radio scheduling entity. The procedure is executed at regular intervals (in the order of a sub-second) when the RLC/MAC-scheduler gives feedback though the feedback interface about the data to be transferred in the next period. The PCPS then examines whether there are media packets that are to be sent with high priority due to very low offset time. These packets are selected first, and, only if there are no such media packets, are packets from the other flows forwarded.

The feedback from the RLC/MAC-scheduler is primarily needed in order to limit the bearer queue-length in the RLC/MAC-scheduler: the pre-scheduler in the PCPS has the queue instead in order to be able to prioritise between the packets of the different flows depending on the QoE needs. The idea is that the pre-scheduler sends to the RLC/MAC-scheduler only as much traffic volume as can be scheduled in the next interval in the most optimal case, but sufficient to ensure that the RLC/MAC-scheduler always has traffic to send (if there are available resources). For example, this may be achieved if two types of information are available in the PCPS: an estimate of maximum currently available radio resources, and an estimate of the traffic that is already queued. The former information may be estimated based on, for example, CQI values of the active users sent by the scheduler. The received highest CQI may be mapped to a transport block size and used as an estimate of the maximum available radio resources in the next period (if a period spans multiple TTIs then naturally this have to be multiplied by the number of TTIs in the period).

At least two methods are available to infer the already queued traffic in the RLC/MAC-scheduler:

A first method based on a performance feedback for data in the MAC queues. [Currently RBS performance reports include information about the received, sent and lost packets ( ); thus, the enqueued traffic may be calculated as (received-sent-lost).]

A second method based on information about how much data has been sent out in the last interval from the scheduler. It is noted however that, in this case, the pre-scheduling also has to consider and correct for the periods of idle scheduling.

In the case of DTT traffic, one feedback possibility is the cell overload indication as currently used in mobile systems. This is sent from the RBS to the RNC in order that the radio controller is able to apply some admission policy to resolve congestion. Based on this instant load feedback it may be possible to regulate the long-delay (DTT) packet scheduling, i.e., to regulate DTT traffic to avoid cell overload.

This alternative approach does not require terminal support. In particular, it does not require QoS bearer support from the terminals (e.g., it may work with current LTE dongles). Also, it does not require using the dynamic QoS mechanisms in the mobile network, thus reducing load in the control plane. The approach is more spectrum-efficient than the standard QoS mechanisms. The impact on the existing radio scheduling is minimal, whilst the feedback interface itself may be based on current feedback mechanisms, with only the reporting frequency having to be increased.

Figure 13:
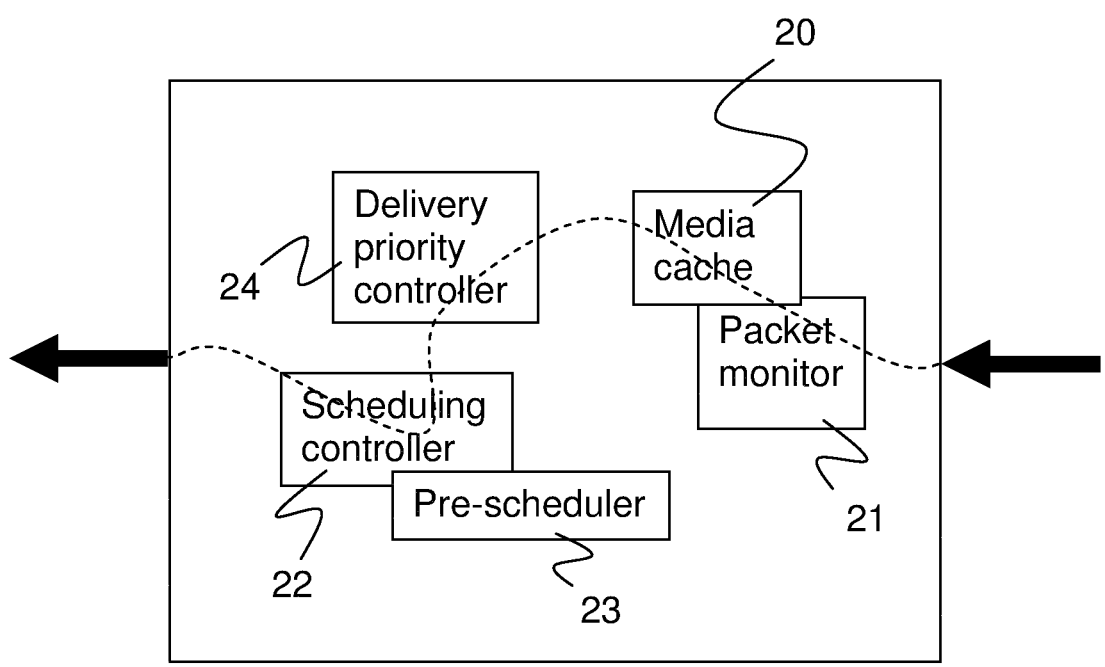
FIG. 13 illustrates schematically an apparatus for use upstream of a radio control layer entity to efficiently prioritise packets for delivery over a radio access bearer.

FIG. 13 illustrates in very general terms an apparatus for efficiently delivering packets over a radio access bearer. The apparatus sits within the radio access network, upstream of the radio control layer entity responsible for establishing and controlling the radio access bearers. The apparatus may implement either of the approaches described above, namely reordering of packets and ensuring just in time delivery to the radio control layer entity or controlling the radio frame scheduling weights via an appropriate interface with the radio control layer entity. As illustrated, the apparatus comprises a media cache 20 that cooperates with a packet monitor 21 to determine an initial delivery priority for an IP flow. The IP flow is passed to a scheduling controller 22 and pre-scheduler 23 that schedules the packets according to the determined priority. A delivery priority controller 24 is responsible for dynamically adjusting the priority for an IP flow as conditions change.

It is noted that the, in the case of the just in time approach, the scheduling controller 22 and pre-scheduler 23 are one and the same. In the case where the apparatus is responsible for adjusting scheduling weights in the radio control layer entity, the scheduling controller 22 is responsible for that adjustment, whilst the pre-scheduler 23 is responsible for maintaining a queue at the apparatus, and prioritising traffic within that queue on a per UE basis (effectively, one pre-scheduler is provided per US).

Figure 14:
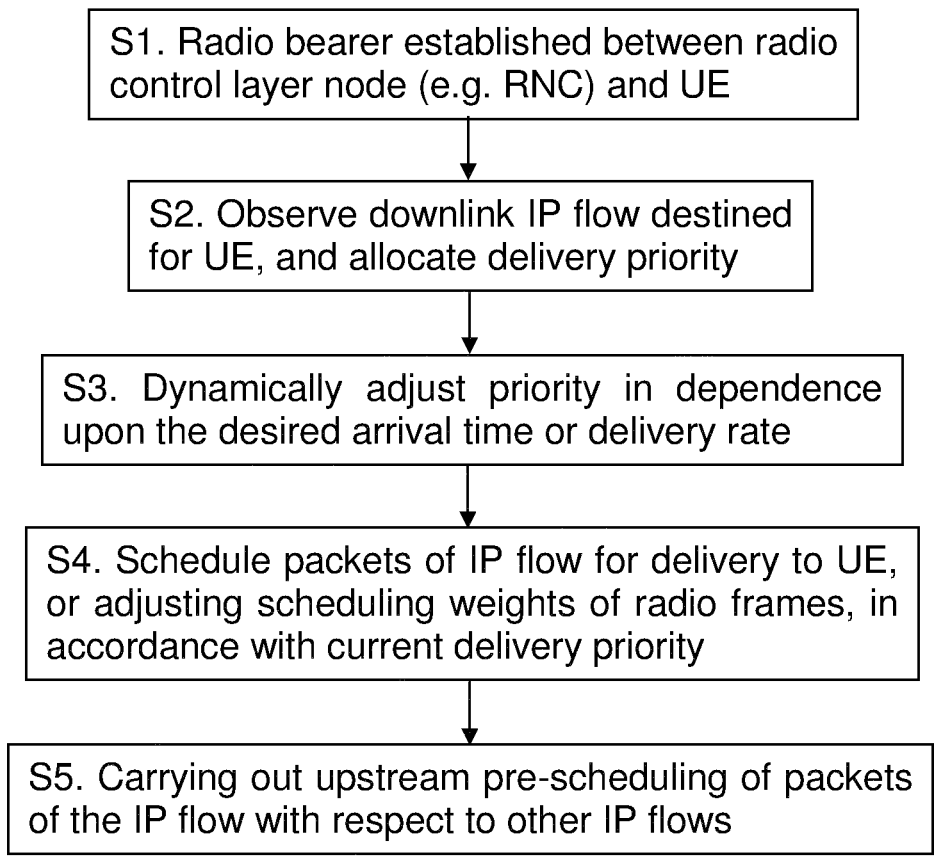
FIG. 14 is a flow diagram illustrating in general terms a process for efficiently delivering packets to a UE.

FIG. 14 is a flow diagram illustrating a generic procedure for prioritising and efficiently delivering packets to a UE.

It will be appreciated by the person of skill in the art that various modifications may be made to the above described embodiments without departing from the scope of the present invention.

The invention claimed is:

1. A method of delivering packets from a radio access network to a user terminal, the method comprising:
   establishing a radio access bearer for transporting data to the user terminal from a radio layer control entity responsible for constructing downlink radio frames;
   within the radio access network, observing an IP traffic flow destined for said user terminal, determining a user application to which the IP traffic flow relates based on the observing, and determining a delivery priority for the IP traffic flow responsive to the determining the user application to which the IP traffic flow relates;

dynamically adjusting the delivery priority in dependence upon current radio conditions and the desired arrival time or delivery rate of packets within the IP traffic flow at the user terminal;

with respect to other downlink user traffic to be sent over the radio interface, scheduling packets of the IP traffic flow in a scheduling queue for transmission to the user terminal over the established radio access bearer, and or adjusting the scheduling weight of radio frames of the established radio access bearer, in accordance with the delivery priority as dynamically adjusted;

upstream of said radio layer control entity, carrying out a pre-scheduling of packets of said IP traffic flow with respect to other IP traffic flows, using a pre-scheduling queue, wherein an order with which the packets of the IP traffic flow are delivered from the pre-scheduling queue to the scheduling queue is determined based on the delivery priority as dynamically adjusted; and providing feedback from said radio control layer entity to a pre-scheduler comprising said rescheduling queue to control said prescheduler to maintain a minimum queue size at the pre-scheduler wherein the feedback corresponds to a size of the scheduling queue.

2. The method according to claim 1 further comprising:
classifying 1P traffic flows towards said user terminal to identify http traffic flows of the IP traffic flows,
routing said http traffic flows to a media cache,
performing said step of dynamically adjusting the delivery priority for each http traffic flow at said media cache, and
delivering the http traffic flows, and other IP traffic flows, to said pre-scheduler at which said pre-scheduling step is carried out,
wherein said prescheduler delivers a volume of packets of the IP traffic flow that is sufficient to ensure that the scheduler has traffic to send corresponding to an estimate of maximum currently available resources while maintaining the minimum queue size at the prescheduler.

3. The method according to claim 1 further comprising:
performing a Deep Packet Inspection on packets of IP traffic flows to identify http traffic flows of the IP traffic flows,
performing said step of dynamically adjusting the delivery priority for each http traffic flow, and
delivering the http traffic flows, and other IP traffic flows, to a pre-scheduler at which said pre-scheduling step is carried out.

4. The method according to claim 2 further comprising:
performing a Deep Packet Inspection on packets of non-http IP traffic flows to determine a user application to which the traffic relates, and
using the results to carry out said pre-scheduling of packets.

5. The method according to claim 2, wherein said step of scheduling packets corresponds to said step of carrying out a pre-scheduling of packets upstream of said radio layer control entity, the step comprising taking into account the respective delivery priorities as dynamically adjusted associated with the http traffic flows, and delivering the reordered packets to said radio layer control entity.

6. The method according to claim 5, wherein said step of scheduling packets is carried out with respect to all IP traffic flows being sent to the radio layer control entity and being associated with a multiplicity of user terminals.

7. The method according to claim 5 further comprising seeking to match the rate of delivery of packets to said radio layer control entity, with the rate of transmission of packets over a radio interface.

8. The method according to claim 5, wherein said pre-scheduling entity has an interface to said radio control entity for receiving from the radio control entity details of current radio conditions.

9. The method according to claim 8 further comprising maintaining at said pre-scheduling entity a plurality of scheduling queues allocated to different delivery priorities, said step of scheduling packets comprising adding packets of the IP traffic flows to a queue in dependence upon the delivery priorities as dynamically adjusted.

10. The method according to claim 5, further comprising, at said media cache, including within packets of an http traffic flow an identification of the dynamically adjusted delivery priority for that flow.

11. The method according to claim 2, wherein said step of pre-scheduling packets is carried out only with respect to IP traffic flows destined for the same user terminal.

12. The method according to claim 11, wherein said step of scheduling packets comprises controlling the scheduling weight for radio frames of the radio access bearer via an interface between said media cache and said the radio layer control entity.

13. The method according to claim 1, wherein said radio access network is a 3G UTRAN and said radio layer control entity is a Radio Network Controller, RNC.

14. The method according to claim 12, wherein said radio access network is a LTE network and said radio layer control entity is a Serving Gateway or a Packet Gateway.

15. The method according to claim 1, wherein an application to which the IP traffic flow relates is an application requiring a Progressive Download.

16. An apparatus comprising one or more computing nodes of a radio access network and configured to deliver packets, received within a radio access network and destined for a user terminal, to a radio control layer entity, wherein the one or more nodes are configured to:
observe an IP traffic flow destined for said user terminal, determine a user application to which the IP traffic flow relates based on the observing, and for determining a delivery priority for the IP traffic flow taking into account the user application to which the traffic relates;
dynamically adjust the delivery priority in dependence upon current radio conditions and the desired arrival time or delivery rate of packets within the IP traffic flow at the user terminal;
schedule packets of the IP traffic flow in a scheduling queue for transmission to the user terminal over the established radio access bearer, with respect to other downlink user traffic to be sent over the radio interface, and/or to adjust the scheduling weight of radio frames of the established radio access bearer, in accordance with the delivery priority as dynamically adjusted; and
preschedule packets of said IP traffic flow with respect to other IP traffic flows within a pre-scheduling queue, wherein the packets of the IP traffic flow are delivered from the pre-scheduling queue to the scheduling queue based on the delivery priority as dynamically adjusted,
wherein a pre-scheduler node of the one or more nodes that comprises said pre-scheduling queue is configured to receive feedback from said radio control layer entity to control said pre-scheduler node to maintain a minimum queue size at the ore-scheduler node, wherein the feedback corresponds to a size of the scheduling queue.

17. The apparatus according to claim 16 wherein the one or more nodes are further configured to:
- classify IP traffic flows towards said user terminal to identify http traffic flows of the IP traffic flows;
- handle by a media cache said http traffic flows including performing the dynamically adjusting the delivery priority for each http traffic flow; and
- deliver the http traffic flows, and other IP traffic flows, to a pre-scheduler node of the one or more nodes at which said pre-scheduling is carried out,
- wherein said pre-scheduler node delivers a volume of packets of the IP traffic flows that is sufficient to ensure that the scheduling queue has traffic to send corresponding to an estimate of maximum currently available resources while maintaining the minimum queue size of the pre-scheduler node.

* * * * *